Oct. 22, 1968  D. C. BRULE  3,407,145
PHOTOCHROMIC MEANS AND METHODS
Filed Feb. 18, 1965
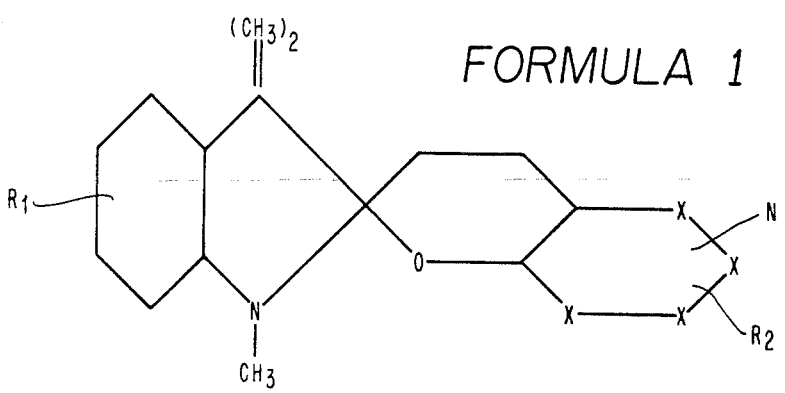
FORMULA 1
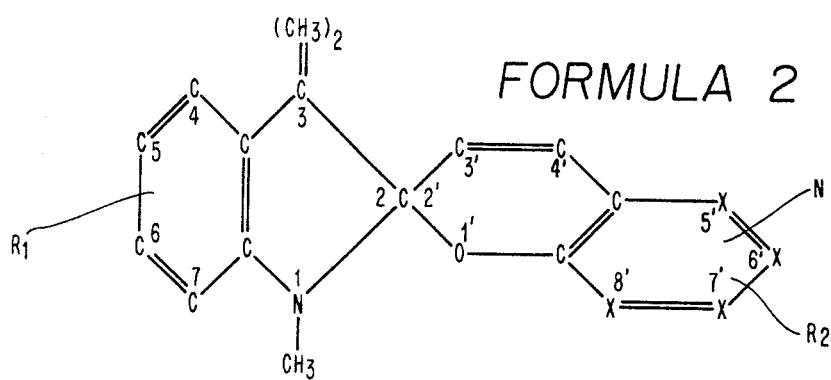
FORMULA 2
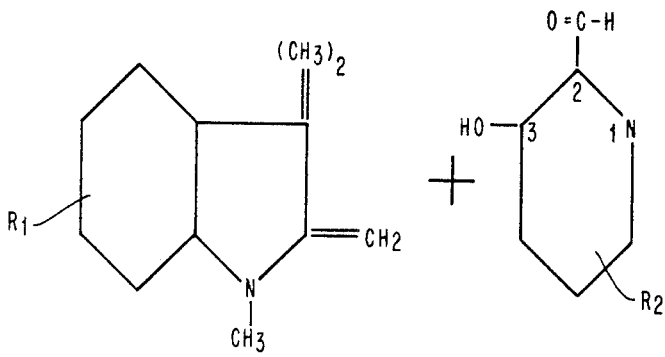
→ FORMULA 1 WITH N IN POSITION 5', + $H_2O$
FORMULA 3
INVENTOR.
DANIEL CHARLES BRULE
BY *Bauer and Seymour*
ATTORNEYS

United States Patent Office 3,407,145
Patented Oct. 22, 1968

3,407,145
PHOTOCHROMIC MEANS AND METHODS
Daniel Charles Brule, Antony, France, assignor to Compagnie de Saint-Gobain, Neuilly-sur-Seine, France
Filed Feb. 18, 1965, Ser. No. 433,692
Claims priority, application France, Feb. 18, 1964,
964,158
5 Claims. (Cl. 252—300)

ABSTRACT OF THE DISCLOSURE

Photochromic objects which change color on exposure to light include the preferred group of photochromic compounds called trimethyl-1,3,3 indoline 2-spiro-2′2H pyridino-2,3-(b) pyrans. They may be included in carriers such as plastics and embodied in windows to automatically regulate the passage of light.

---

This invention relates to the photochrome and phototrope sciences. The words photochrome and phototrope are used more or less interchangeably to describe a phenomenon associated with actinic light in which substances change color, become opaque, or absorb one wave length and issue another when affected by the light. The most notable of such compounds are those which respond to the invisible forms of radiation such as infrared and ultraviolet. Known types of these materials have been made use of in the manufacture of variable transmission windows for buildings and vehicles, the purpose of which has been to exclude the heat of the day, automatically and to a degree commensurate with the intensity of the radiation involved, and to regulate the amount of light admitted through the window. Among the methods of use which have been proposed are to coat an ordinary sheet of window glass with a transparent lacquer containing a photochrome, and to dissolve a photochrome in a suitable solvent and sandwich the solvent between two layers of glass.

The principal properties which are desired in variable transmission windows are high speeds of coloration and decoloration; coloration and decoloration operating as a function of the quantity of radiation; stability of the photochrome under conditions of use for long periods; when the object is to exclude or extensively limit the passage of radiation, a maximum absorption of light, that is to say practically complete opacity when the radiation received reaches a predetermined peak value; an absorption spectrum covering, so far as possible, the whole wave length of visible light from 4000 to 7500 A.; in general the coloration or decoloration should take place within a few minutes and preferably within a few seconds following a change in the intensity of the radiation received. Not all of these properties are to be expected of any one photochrome and, indeed, some of them are mutually inconsistent. The art seeks to find photochromes with properties which satisfy particular needs.

It is an object of the present invention to provide photochromes which remain transparent while becoming colored, being thus suitable for windows of vehicles as well as for those of stationary structures. Another object is to provide a class of photochromes among the members of which are a number which yield different colors under excitation, thus providing scope for the efforts of artists and decorators. Another object is to provide a class of photochromes, some members of which color and decolor at different speeds, thus providing rates of change adapted to different conditions.

Another object is to provide a class of photochromes which can be used in liquid or solid solution, which are compatible with typical resins, for instance the vinyls, and which can be embodied in useful solutions, films, and solid objects, such embodiments being capable of wide variation in change of coloration and time of recovery. Other objects are to make such novel photochromic means by simple methods which do not degrade the resins.

The objects of the invention are accomplished, generally speaking, by photochromic means embodying a carrier and an associated photochrome, the photochrome being a compound represented by Formula 1 in which the N is in one of positions X and the other positions X are C, and at least one of $R_1$ and $R_2$ is of a group consisting of lower alkyl, lower alkoxy, halogen, $NO_2$, OH, CN, $CF_3$ and phenyl, of which lower alkyl, lower alkoxy, and phenyl may bear halogen, nitro, and amino as substituents, and $R_2$ is attached to C of the ring; and by a method of preparing a manufacture having the properties of transparency and color change under irradiation by actinic light which comprises combining a photochromic compound having the structure of Formula 1 in which the N is in one of positions X and the other positions X are C, and at least one of $R_1$ and $R_2$ is of a group consisting of lower alkyl, lower alkoxy, halogen, $NO_2$, OH, CN, $CF_3$ and phenyl, of which lower alkyl, lower alkoxy, and phenyl may bear halogen, nitro, and amino as substituents, and $R_2$ is attached to C of the ring with a transparent carrier; and by an article of manufacture embodying a carrier and a compound according to Formula 2 in which at least one of $R_1$ and $R_2$ is from the group consisting of lower alkyl, lower alkoxy, halogen, nitro, hydroxy, cyanogen, trifluoro methane, and phenyl, of which alkyl, alkoxy and phenyl may bear halogen, nitro, and amino as substituents, $R_2$ is attached to C of the ring, one X is N, and the other X's are C atoms.

One of the classes of photochromes of the invention has the structure of Formula 2 in which N is in position 5′; in another class the N is in position 6′; in a third the N is in position 7′; and in another the N is in position 8′. These compounds are called the trimethyl-1,3,3 indoline 2-spiro-2′ pyridino (b) pyrans. In these compounds at least one of $R_1$ and $R_2$ is from the class of halogen (usually chlorine), alkyl of one to about ten carbon atoms, called lower alkyl, lower alkoxy having the same limits as to carbon atoms, nitro, hydroxy, cyanogen, trifluoro methane, and phenyl. The alkyl, alkoxy and phenyl may themselves be substituted by halogen, usually chlorine, amino, and nitro, examples of which are chlorophenyl, nitrophenyl, and aminophenyl.

In order to prepare the photochromes, Formula 3 may be followed, a trimethyl-1,3,3, methylene-2 indoline being reacted with a hydroxy formyl pyridine, the respective nuclei bearing the substituents desired. The formyl-2-hydroxy-3-pyridine (substituted by $R_2$ as desired) may be prepared by reacting 3-hydroxy pyridine with formaldehyde and NaOH (10%) at 100° C. for 2 hours and the resulting product (2-hydroxy methyl-3-hydroxy pyridine) with $MnO_2$ and $H_2SO_4$ for 1 hour at 100° C. This compound has the constitution of Formula 2 with N in position 5′. The structures in which N is in positions 6′, 7′, 8′ are prepared similarly from formyl-3-hydroxy-4-pyridine, formyl-4-hydroxy-3-pyridine, and formyl-3-hydroxy-2-pyridine, respectively.

In short, these substances may be prepared by the action of suitably substituted derivatives of trimethyl-1,3,3 methylene-2 indoline on a suitably substituted hydroxy-formyl-pyridine in alcoholic medium in the presence of a little piperidine.

After irradiation of solutions of these substances by a source of ultraviolet light the spectrums of the colored products show a band at about 5900 to 6200 A., the exact position of this band being a function of the nature of the substituents employed. In these cases, it should be remembered that one or the other of the nuclei entering into this reaction should bear a substituent of the classes listed hereinabove. When these substances are to be dissolved in a solvent, it is preferred to use solvents of low polarity, for example toluene, tetrahydrofuran, dimethyl formamide, toluene/acetic acid, butanol, methanol, and ethyl acetate.

The photochromes are also compatible with numerous polymers, particularly the polyvinyl compounds, of which those of low polarity are preferred, and which must be soluble in at least one of the solvents which dissolve the photochrome. Inasmuch as the solvents in the list are particularly efficacious in their solvent action on both polymers and photochromes it is possible to use them to make lacquers, varnishes, and solids, all of which show the phototropic reaction when irradiated by actinic light.

As an example of the best form of the method, chloro-5-trimethyl-1,3,3 indoline 2-spiro-2'-2H-pyridino 2,3-(b) pyran was dissolved in toluene at −30° C. The solution was colorless. It was irradiated for 10 seconds with a Philips SP 500 ultraviolet lamp, the solution became blue and became colorless about 1 second after excitation stopped.

These photochromes have the power to change color under irradiation when they are dissolved in a solvent, or when they are in a dissolved state in a solid solution in a plastic mass such as a lacquer film, and this property of maintaining their phototropic power after undergoing a change in state is of material value in the construction of variable transmission windows.

These photochromes may be dissolved in solvents and the solution can be entrapped between two sheets of glass to act as a light filter which changes under the impact of different dosages of actinic light. The preferred solvents are those which have low polarity, for instance hexane and toluene, and because these solvents are compatible with numerous polymers used in the manufacture of lacquers the solutions are valuable for incorporation in films and lacquers.

It is also possible to incorporate the photochrome in a plastic mass, for instance in a plate or sheet of polyvinyl butyral, which is merely illustrative. This particular resin is useful in making sandwich glass and it is even more useful for that purpose when the photochrome has been incorporated in it. A method of incorporating the photochrome in the film is suggested above and explained in more detail elsewhere herein.

It is also possible to prepare a lacquer or film containing the photochrome, using a volatile solvent in which the photochrome and the organic resin are dissolved, the lacquer being spread on the glass and leaving a transparent film containing the photochrome after evaporation of the solvent. Such films are sometimes fragile and may be protected by over coats of glass, plastic, or lacquer.

Attention is drawn to the fact that not all these compounds are colorless in their original state, but in those cases in which an initial color is visible there is a reversible change to a different color under irradiation. It is also to be noted that when the photochromes are incorporated in semirigid bodies such as polyvinyl resins of various sorts, the speed of change from the initial state to the most highly colored state and back again may be slower. This is not objectionable in use because in many instances the rates of change are so rapid in liquid solution as to be difficult to measure at ordinary temperature. It is consequently advisable to carry out tests on solutions at 0° C. as this reduces the speed of change to values which are more readily determined.

In the drawing:

Formula 1 represents the class of compounds which are useful in this invention;

Formula 2 indicates the probable locations of the double bonds and it is to be noted in this respect that the positions of these double bonds should remain the same; and Formula 3 represents the preferred reaction, the use of which produces the compound of Formulas 1 and 2.

These compositions may be used to impregnate the surfaces of solid resinous bodies by employing a solvent for the photochrome which at least swells the resin, the resin being removed from the solvent before actual solution of the resin has occurred. In operation with resinous solutions it is frequently desirable to include some of the plasticizer which is used in the resin in the solution of the photochrome. Thus, when it is desired to make thick or thin sheets in which a photochrome is uniformly dispersed, the resin and the photochrome may be dissolved in different portions of the same solvent, each portion containing a small amount, a few percent, of a suitable plasticizer for the resin, the two solutions being thereafter mixed and solidified.

Among the advantages of this invention are photochromic compositions which include the photochrome and a support or carrier which may be a solvent, liquid or solid in which the photochrome is, in effect, in solid solution. These novel manufactures may be colored or colorless in their inert state but they have the general property of changing color when excited by actinic light, especially ultraviolet light. They remain transparent under all conditions. The depth of the color produced is proportioned to the intensity of the exciting source. The colors produced vary according to the solvent employed. Recovery is extremely rapid in solution in a solvent, is slower when the solvent contains a resin, and is much more retarded when the resin is solid. This class of photochromic materials is characterized by good selectivity as to color and high selectivity as to time of recovery, and this selectivity makes the materials suited to different uses. They have long life without degradation or loss of activity.

As many apparently widely different embodiments of the present invention may be made without departing from the spirit and scope thereof, it is to be understood that the invention is not limited to the specific embodiments.

What is claimed is:

1. Photochromic means embodying in cooperative association a transparent body and a compound having the formula

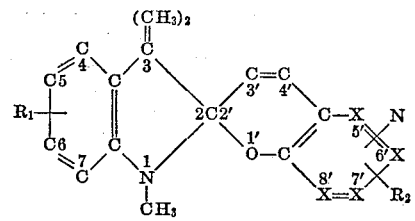

in which each of $R_1$ and $R_2$ is selected from the group consisting of hydrogen, lower alkyl, lower alkoxy, halogen, nitro, hydroxy, cyanogen, trifluoro methane, and phenyl, of which alkyl, alkoxy and phenyl may bear halogen, nitro, and amino as substituents, $R_2$ is attached to C of the ring, one X is N, and the other X's are C atoms, with the proviso that both $R_1$ and $R_2$ are not H.

2. Photochromic means having as essential elements, in cooperative association, a solvent and dissolved therein a compound represented by the formula

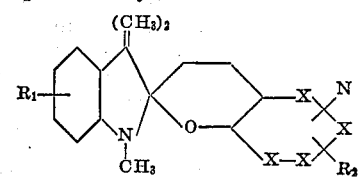

in which N is in one of the positions X and the other positions X are C, each of $R_1$ and $R_2$ is selected from the group consisting of H, lower alkyl, lower alkoxy, halogen, $NO_2$, OH, CN, $CF_3$ and phenyl of which lower alkyl, lower alkoxy, and phenyl may bear halogen, nitro, and amino as substituents, $R_2$ is attached to C of the ring, with the proviso that both $R_1$ and $R_2$ are not H.

3. Photochromic means having as essential elements, in cooperative association, a transparent resin and dispersed therein a compound represented by the formula

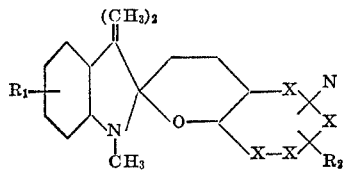

in which N is in one of the positions X and the other positions X are C, each of $R_1$ and $R_2$ is selected from the group consisting of H, lower alkyl, lower alkoxy, halogen, $NO_2$, OH, CN, $CF_3$ and phenyl of which lower alkyl, lower alkoxy, and phenyl may bear halogen, nitro, and amino as substituents, $R_2$ is attached to C of the ring, with the proviso that both $R_1$ and $R_2$ are not H.

4. Photochromic means having as essential elements, in cooperative association, a transparent plate and attached thereto and distributed over a substantial area thereof a compound represented by the formula

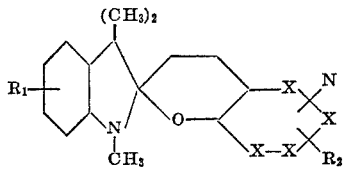

in which N is in one of the positions X and the other positions X are C, each of $R_1$ and $R_2$ is selected from the group consisting of H, lower alkyl, lower alkoxy, halogen, $NO_2$, OH, CN, $CF_3$ and phenyl of which lower alkyl, lower alkoxy, and phenyl may bear halogen, nitro, and amino as substituents, $R_2$ is attached to C of the ring, with the proviso that both $R_1$ and $R_2$ are not H.

5. The method of using trimethyl-1,3,3 indoline 2-spiro-2'2H-pyridino-2,3 (b) pyrans having the structure

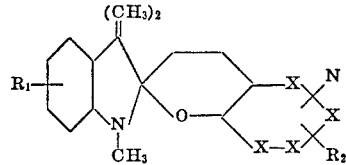

in which the N is in one of positions X and the other positions X are C, and each of $R_1$ and $R_2$ is selected from the group consisting of hydrogen, lower alkyl, lower alkoxy, halogen, $NO_2$, OH, CN, $CF_3$ and phenyl, of which lower alkyl, lower alkoxy, and phenyl may bear halogen, nitro, and amino as substituents, and $R_2$ is attached to C of the ring with the proviso that both $R_1$ and $R_2$ are not H, which comprises irradiating a said compound with actinic light.

References Cited
UNITED STATES PATENTS 3,085,469  4/1963  Carlson _____ 88—107 X
3,278,449  10/1966  Hardwick et al. _____ 252—300

LEON D. ROSDOL, *Primary Examiner.*

R. D. LOVERING, *Assistant Examiner.*